(12) United States Patent
Tien et al.

(10) Patent No.: US 6,610,107 B1
(45) Date of Patent: Aug. 26, 2003

(54) METHOD FOR MODIFYING FIBER SURFACES

(75) Inventors: Chin-Heng Tien, Miaoli (TW); Cha-Chen Ho, Hsinchu (TW); Lien Tai Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 149 days.

(21) Appl. No.: 09/589,292

(22) Filed: Jun. 8, 2000

(30) Foreign Application Priority Data

Jun. 28, 1999 (TW) ........................ 88110849 A

(51) Int. Cl.$^7$ .................. D06M 11/00; C08F 283/04; C09K 21/00
(52) U.S. Cl. .................. 8/115.6; 525/455; 252/601; 252/8.83; 252/8.84
(58) Field of Search .................. 525/455; 252/601, 252/8.83, 8.84; 8/115.6

(56) References Cited

U.S. PATENT DOCUMENTS 4,904,408 A * 2/1990 Kud et al. ............. 252/174.24
6,060,566 A * 5/2000 Denzinger et al. .......... 525/455

FOREIGN PATENT DOCUMENTS

JP        02001032173 A  *  2/2001

* cited by examiner

Primary Examiner—Yogendra N. Gupta
Assistant Examiner—Preeti Kumar
(74) Attorney, Agent, or Firm—Sughrue Mion, PLLC

(57) ABSTRACT

The invention discloses a method for modifying fiber surfaces to impart hydrophilicity and thermal regulative properties thereto, comprising treating fiber with an alcohol (for example, polyol), and carrying out chemical reaction (for example, graft polymerization) between fiber and alcohol.

6 Claims, 1 Drawing Sheet

METHOD FOR MODIFYING FIBER SURFACES

BACKGROUND OF THE INVENTION

1. Field of the Invention

The present invention relates to a method for modifying fiber surfaces to provide fiber having enhanced hydrophilicity and thermal regulative properties.

2. Description of the Related Arts

Due to the inherent nature of polyester polymers and aliphatic polyamide polymers (e.g., nylon), fabrics formed entirely from these polymers tend to exhibit relatively poor moisture absorption and release properties and fail to have sufficient thermal regulative characteristics. Typically, in apparel fabrics, comfort is obtained by blending those polymers with hydrophilic fibers such as cotton and wool, which has been disclosed in U.S. Pat. No. 5,312,667.

It has long been recognized that there are various known methods for enhancing the hydrophilicity of the polymers. Two examples are the preparation of polymers using appropriate hydrophilic co-monomers and the application of hydrophilic add-on agents or coatings (See, for example, JP 09316782 and JP 08109267). However, these prior approaches have not met with widespread acceptance, in particular due to the lack of permanence under repeated laundering conditions.

The graft polymerization of hydrophilic vinyl monomers onto hydrophobic substrates has been described in U.S. Pat. No. 3,297,786 for use with nylon, polypropylene, polyesters and other substances. See, also, for example, U.S. Pat. Nos. 3,252,880 and 3,278,639. The modification of polyester materials using various chemicals to produce hydrophilic groups on fiber surfaces has been described in U.S. Pat. Nos. 4,808,188 and 5,354,815. The drawbacks of this method include the high cost of chemicals, the low production rate and the production of bulk wastewater during the process.

Accordingly, it is desirable to provide a method for modifying fiber surfaces which overcomes the above disadvantages, and which imparts greatly enhanced hydrophilicity to polymer materials to help transport water (sweat) away from the skin or undergarment of the wearer. A further advantage of the method of the present invention is that it can be readily carried out using conventional textile finishing equipment, and the chemicals used in this method can be recovered and reused. Thus, the method is environmentally friendly.

SUMMARY OF THE INVENTION

It is therefore a primary object of the present invention to provide a method for modifying fiber surfaces to impart hydrophilicity and thermal regulative properties thereto. The method comprises treating fiber with an alcohol, especially a polyol, and carrying out chemical reaction between said fiber and said alcohol.

In one preferred embodiment of the present invention, an aliphatic polyamide polymer or polyester polymer is provided having enhanced hydrophilicity and thermal regulative properties. The polymer is bonded to a hydroxyl group by using graft polymerization of an alcohol onto a hydrophobic substrate.

BRIEF DESCRIPTION OF THE FIGURE

The present invention will be more fully understood and further advantages will become apparent when reference is made to the following description of the invention and the accompanying drawings in which.

DETAILED DESCRIPTION OF THE INVENTION

Figure 1:
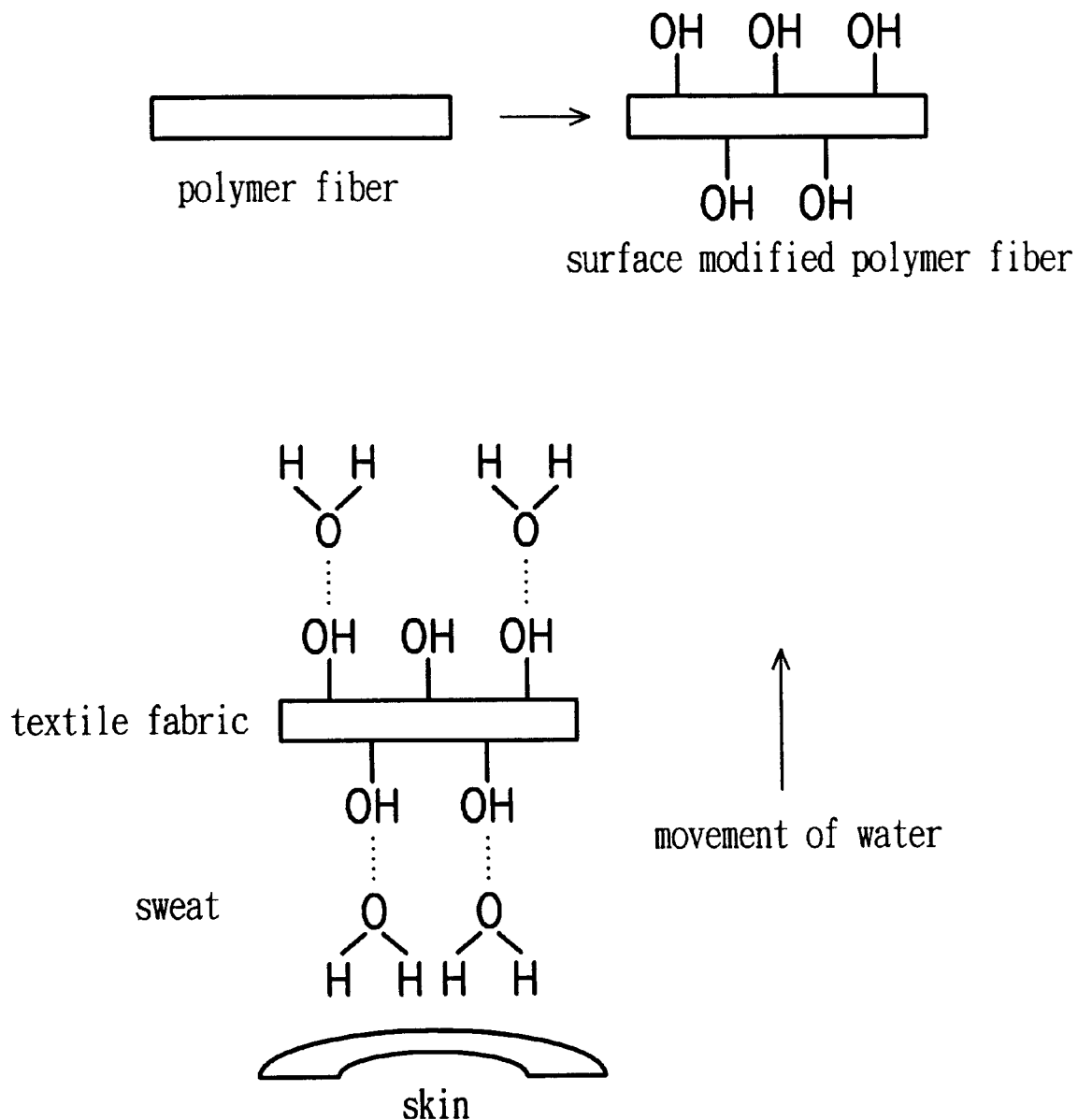
FIG. 1 is a schematic diagram showing a surface modified polymer fiber and the mechanism of water evaporation from skin through a textile fabric.

In accordance with the present invention, there is provided a polymer such as aliphatic polyamide or polyester polymer having enhanced hydrophilicity and thermal regulative properties. The polymer is in the form of a fibrous textile substrate, e.g., fiber, fabric, knitted fabric, woven fabric, non-woven fabric, silver, thread, yarn, web, etc. The fibrous textile substrate is impregnated, padded, or otherwise contacted with an aqueous bath containing hydrophilic alcohol and fixed in the textile substrate in a batch process or any suitable continuous or semi-continuous process using conventional equipment. The textile substrate can be formed of polymers alone or can be blended in various proportions with other materials such as cotton or wool. Co-polymers and terpolymers of the monomers of the polymer can also be used.

The term "aliphatic polyamide polymer" used herein includes any long-chain polymeric or co-polymeric amide which has recurring amide groups as an integral part of the main polymer or co-polymer chain. Suitable examples of aliphatic polyamide polymer include nylon 6 or poly($\Omega$-caprolactam); nylon 66 or poly(hexamethylene-adipic acid) amide; nylon 610 or poly(hexamethylene-sebacic acid) amide; and the like.

The term "polyester polymer" used herein includes highly polymeric, essentially linear polyester. Polyester polymers can include, but are not limited to, linear polyesters of aromatic dicarboxylic acids and dihydric compounds such as polyethylene terephthalate, modified polyesters and co-polymers, etc.

Referring to FIG. 1, the surface modified fiber has hydroxyl groups thereon. These groups can bond to water molecules to form hydrogen bonds, thereby absorbing sweat perspired from skin. However, the bond strength is not strong, so the water molecules can move from the inner garment (high humidity) to the outer garment (low humidity), and then evaporate into air, thus achieving the purposes of sweat absorption and thermal regulation.

The method of the present invention involves contacting the polymer materials with an aqueous bath containing hydrophilic alcohol. The time, temperature and treatment bath concentration may be empirically determined depending on the particular form of polymer materials being treated and the fabric may be left to stand at room temperature for several hours to a day. Alternatively, the treatment time may be reduced by steaming or by heating in an oven or tenter.

The compounds containing hydroxyl groups can covalently bond to polymer fiber by graft polymerization. As examples of polyester fiber and nylon fiber, the reaction equations below are illustrative:

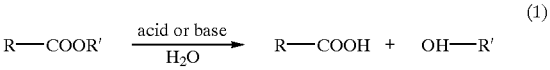

(1)

-continued

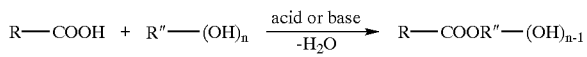
(2)

or nylon fiber:

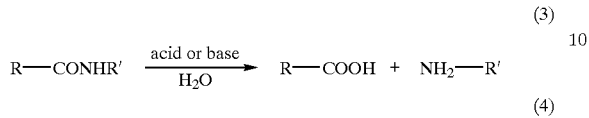
(3)

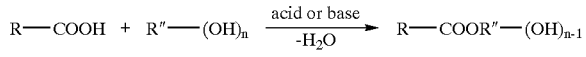
(4)

Equations (1) and (3) use an acid or base such that polyester or nylon fiber produces a carboxyl group thereon; and equations (2) and (4) use this carboxyl group and react with the hydrophilic hydroxyl group of the alcohol in the presence of the acid or base as a catalyst to dehydrate and form an ester bond.

The term "alcohol" used herein includes polyol, such as polyvinyl alcohol, polyethylene glycol, polypropylene glycol, or polybutene glycol. The modified polymers thereof can also be used. When polyvinyl alcohol is used, preferably, the molecular weight (Mw) is less than 200,000 g/mole, and more preferably, 1,000~200,000 g/mole, and the concentration is preferably less than 10 wt %, and more preferably, 0.01~10 wt %.

Suitable fibers used in the present method include, but are not limited to, polyester fiber, polyamide fiber, fiber blended with polyester, fiber blended with polyamide, or fabric or non-fabric thereof. Preferably, the fiber used herein is polyester fiber or polyamide fiber.

According to the present invention, the chemical reaction between alcohol and polymer fiber can be graft polymerization, which is undergone in the presence of acid or base as a catalyst. The acid can be organic or inorganic acid, wherein the organic acid includes formic acid, acetic acid, or the mixtures thereof, and the inorganic acid includes sulfuric acid, hydrochloric acid, phosphoric acid, or the mixtures thereof. In the same manner, the base used herein includes, but is not limited to, sodium hydroxide, potassium hydroxide, or lithium hydroxide. Further, the graft polymerization is carried out at 50~220° C., and more preferably at 150~180° C.

According to the present invention, the reaction between the hydroxyl group of the alcohol and polymer fiber surfaces can form covalent bonding, which imparts enhanced hydrophilicity and thermal regulative properties thereto.

Without intending to limit it in any manner, the present invention will be further illustrated by the following examples.

EXAMPLES

The efficiency of moisture absorption and sweat evaporation of fibers was evaluated by water evaporation rate and the same rate after washing 5 times with water. The higher evaporation rate, the better the efficiency.

The methods of testing water evaporation rate and washing were described below, respectively.

(1) Method of Testing Water Evaporation Rate:

A 6×6 cm$^2$ swatch being tested was placed on a precise electronic balance connected to a recorder under a stable environment at 23° C. and 65%RH. 0.03 g of water was dropped onto the swatch and the change in weight was recorded every 1.5 min. The water evaporation rate was calculated by the following equation:

$$\text{Water evaporation rate (W \%)} = (W_0 - W_t)/W_0 \times 100\% \qquad (5)$$

Wherein:

$W_0$ was the weight of initial water $W_t$ was the water weight after time t

W % was the water evaporation rate after time t (2) Method of Washing Swatch:

According to the methodology described in AATCC Test Method 61-1A (An American National Standard; AATCC Technical Manual (1989), p.101–104), wherein the conditions and parameters were as follows: 0.5 g/L of AATCC detergent 124; 10 steel beads; 40° C. and 45 min.

Example 1

A 180 g/m$^2$ swatch of 100% polyester knit was treated with 2 g/L of sodium hydroxide at 100° C. for 60 min, and then neutralized with 0.7% acetic acid. The graft polymerization was carried out in an aqueous solution, wherein the chemical preparation was composed of 1.0% polyvinyl alcohol (molecular weight 25,000 g/mole) and 1.0% phosphoric acid, at 100° C. for 60 min.

Example 2

The knit swatch and pre-treatment conditions were the same as EXAMPLE 1, except that chemical preparation was composed of 3.0% polyvinyl alcohol (molecular weight 25,000 g/mole) and 1.0% phosphoric acid. The reaction was carried out at 100° C. for 60 min.

Example 3

The knit swatch and pre-treatment conditions were the same as EXAMPLE 1, except that chemical preparation was composed of 5.0% polyvinyl alcohol (molecular weight 25,000 g/mole) and 1.0% phosphoric acid. The reaction was carried out at 100° C. for 60 min.

Example 4

The knit swatch and pre-treatment conditions were the same as EXAMPLE 1, except that chemical preparation was composed of 5.0% polyvinyl alcohol (molecular weight 15,000 g/mole) and 1.0% phosphoric acid. The reaction was carried out at 130° C. for 60 min.

Example 5

The knit swatch and pre-treatment conditions were the same as EXAMPLE 1, except that chemical preparation was composed of 5.0% polyvinyl alcohol (molecular weight 25,000 g/mole) and 1.0% phosphoric acid. The reaction was carried out at 130° C. for 60 min.

Example 6

The knit swatch and pre-treatment conditions were the same as EXAMPLE 1, except that chemical preparation was composed of 5.0% polyvinyl alcohol (molecular weight 83,000 g/mole) and 1.0% phosphoric acid. The reaction was carried out at 130° C. for 60 min.

Example 7

The knit swatch and pre-treatment conditions were the same as EXAMPLE 1, except that chemical preparation was composed of 5.0% polyvinyl alcohol (molecular weight 117,000 g/mole) and 1.0% phosphoric acid. The reaction was carried out at 130° C. for 60 min.

Example 8

The knit swatch and pre-treatment conditions were the same as EXAMPLE 1, except that chemical preparation was composed of 5.0% polyvinyl alcohol (molecular weight 130,000 g/mole) and 1.0% phosphoric acid. The reaction was carried out at 130° C. for 60 min.

The water evaporation rates for the surface modified polymer fibers obtained from EXAMPLES 1–8 were measured according to the methods described above. The results are shown in Table 1.

Example 9

A 230 g/m² swatch of polyester/elastic fiber knit was modified by a continuous process (i.e. by dipping, padding, and curing). The chemical preparation was composed of 5.0% polyvinyl alcohol (molecular weight 25,000 g/mole) and 0.5% phosphoric acid. The reaction was carried out at 180° C. for 5 min.

Example 10

The knit swatch and modification process were the same as EXAMPLE 9, except that chemical preparation was composed of 5.0% polyvinyl alcohol (molecular weight 25,000 g/mole) and 1.0% phosphoric acid. The reaction was carried out at 180° C. for 5 min.

Example 11

The knit swatch and modification process were the same as EXAMPLE 9, except that chemical preparation was composed of 5.0% polyvinyl alcohol (molecular weight 25,000 g/mole) and 2.0% phosphoric acid. The reaction was carried out at 180° C. for 5 min.

The water evaporation rates of the surface modified polymer fibers were obtained from EXAMPLES 9–11 were measured according to the methods described above. The results are shown in Table 2.

Example 12

A 270 g/m² swatch of nylon/elastic fiber knit was modified by a continuous process. The chemical preparation was composed of 5.0% polyvinyl alcohol (molecular weight 25,000 g/mole) and 1.0% phosphoric acid. The reaction was carried out at 180° C. for 5 min. The result of water evaporation rate measured is shown in Table 3.

Example 13

A 180 g/m² swatch of woven 100% polyester fabric was modified by a continuous process. The chemical preparation was composed of 5.0% polyvinyl alcohol (molecular weight 25,000 g/mole) and 1.0% phosphoric acid. The reaction was carried out at 180° C. for 5 min. The result of water evaporation rate measured is shown in Table 4.

Comparative Example 1 (U.S. Pat. No. 4,808,188)

A 180 g/m² swatch of woven 100% polyester fabric was treated with 2 g/L of $LiOH/NaBH_{4(aq)}$ at 130° C. for 60 min. The water evaporation rate for the comparative example is shown in Table 4.

Comparative Example 2 (JP 09316782)

The modification and treatment processes were the same as EXAMPLE 7 in JP 09316782. The water evaporation rate for the comparative example is shown in Table 5.

TABLE 1

The surface modification of PET knit

| Example | Mw of PVA[a] (g/mole) | Conc. of PVA[a] (%) | Reaction temp. (° C.) | WER[b] (%) | WER (%) after 5× washing |
|---|---|---|---|---|---|
| Prior modification | — | — | — | 10.74 | — |
| 1 | 25,000 | 1.0 | 100 | 32.63 | 24.11 |
| 2 | 25,000 | 3.0 | 100 | 37.05 | 21.74 |
| 3 | 25,000 | 5.0 | 100 | 42.73 | 21.06 |
| 4 | 15,000 | 5.0 | 130 | 25.44 | 15.68 |
| 5 | 25,000 | 5.0 | 130 | 22.63 | 13.71 |
| 6 | 83,000 | 5.0 | 130 | 23.96 | 14.11 |
| 7 | 117,000 | 5.0 | 130 | 13.71 | 10.96 |
| 8 | 130,000 | 5.0 | 130 | 24.16 | 13.60 |
| Comparative 1 | — | — | — | 15.56 | — |

[a]PVA polyvinyl alcohol.
[b]WER water evaporation rate, measured for 12 min.

TABLE 2

The surface modification of PET/Lycra knit

| Example | Mw of PVA[a] (g/mole) | Conc. of PVA[a] (%) | Conc. of $H_3PO_4$ (%) | WER[b] (%) | WER (%) after 5× washing |
|---|---|---|---|---|---|
| Prior modification | — | — | — | 4.83 | — |
| 9 | 25,000 | 5.0 | 0.5 | 26.69 | 15.66 |
| 10 | 25,000 | 5.0 | 1.0 | 32.26 | 29.47 |
| 11 | 25,000 | 5.0 | 2.0 | 23.53 | 21.48 |

[a]PVA polyvinyl alcohol.
[b]WER water evaporation rate, measured for 12 min.

TABLE 3

The surface modification of Nylon/Lycra knit

| Example | Mw of PVA[a] (g/mole) | Conc. of PVA[a] (%) | Conc. of $H_3PO_4$ (%) | WER[b] (%) | WER (%) after 5× washing |
|---|---|---|---|---|---|
| Prior modification | — | — | — | 7.34 | — |
| 12 | 25,000 | 5.0 | 1.0 | 27.56 | 26.45 |

[a]PVA polyvinyl alcohol.
[b]WER water evaporation rate, measured for 12 min.

TABLE 4

The surface modification of PET woven fabric

| Example | Mw of PVA[a] (g/mole) | Conc. of PVA[a] (%) | Conc. of $H_3PO_4$ (%) | WER[b] (%) | WER (%) after 5× washing |
|---|---|---|---|---|---|
| Prior modification | — | — | — | 10.74 | — |
| 13 | 25,000 | 5.0 | 1.0 | 35.86 | 30.73 |
| Comparative 1 | — | — | — | 14.56 | — |

[a]PVA polyvinyl alcohol.
[b]WER water evaporation rate, measured for 12 min.

TABLE 5

| Comparative 2 | 3 hours | 6 hours | 12 hours | 24 hours |
|---|---|---|---|---|
| WER* (%) | 26 | 42 | 67 | 83 |

*Test condition: 25° C. and 40% RH.

While the invention has been particularly shown and described with the reference to the preferred embodiment thereof, it will be understood by those skilled in the art that various changes in form and details may be made without departing from the spirit and scope of the invention.

What is claimed is:

1. A method for modifying fiber surfaces to impart hydrophilicity and thermal regulative properties thereto, comprising reacting fibers with a polyol to obtain fibers containing hydroxyl groups, wherein the fibers are polyester fibers, polyamide fibers, fibers blended with polyester, fibers blended with polyamide, or a woven fabric or a non-woven fabric thereof, and the polyol is polyvinyl alcohol, polyethylene glycol, polypropylene glycol, polybutene glycol, or modified polymers thereof, wherein the molecular weight of the polyvinyl alcohol is 1,000–200,000 g/mole, and the concentration of the polyvinyl alcohol is 0.01–10 wt %.

2. The method as claimed in claim 1, wherein the reaction of the fibers with the polyol is a graft polymerization reaction.

3. The method as claimed in claim 1, wherein the reaction is carried out in the presence of an acid or a base as a catalyst.

4. The method as claimed in claim 3, wherein the acid is an organic acid selected from the group consisting of formic acid, acetic acid, and mixtures thereof, or an inorganic acid selected from the group consisting of sulfuric acid, hydrochloric acid, phosphoric acid, and mixtures thereof.

5. The method as claimed in claim 4, wherein the base is sodium hydroxide, potassium hydroxide, lithium hydroxide, or a mixture thereof.

6. The method as claimed in claim 1, wherein the reaction is carried out at 50–220° C.

* * * * *